United States Patent
Joo et al.

(10) Patent No.: US 7,456,783 B2
(45) Date of Patent: Nov. 25, 2008

(54) GPS SIGNAL REPEATER AND GPS RECEIVER OF STATIONARY ORBIT SATELLITE, AND METHOD FOR POSITIONING STATIONARY ORBIT SATELLITE USING THE SAME

(75) Inventors: In-One Joo, Daejon (KR); Jeom-Hun Lee, Daejon (KR); Jae-Hoon Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/600,963

(22) Filed: Nov. 16, 2006

(65) Prior Publication Data
US 2007/0159382 A1 Jul. 12, 2007

(30) Foreign Application Priority Data
Nov. 16, 2005 (KR) ............. 10-2005-0109658

(51) Int. Cl.
*G01S 1/00* (2006.01)
*H04B 7/185* (2006.01)
(52) U.S. Cl. ............. 342/357.06; 342/357.02; 342/352
(58) Field of Classification Search ................ 342/357.01–357.17
See application file for complete search history.

(56) References Cited

U.S. PATENT DOCUMENTS

| 4,445,118 | A | * | 4/1984 | Taylor et al. ........... 342/357.09 |
| 4,809,006 | A | * | 2/1989 | Dar ....................... 342/352 |
| 5,467,282 | A | * | 11/1995 | Dennis ................... 701/215 |
| 5,717,404 | A | * | 2/1998 | Malla ..................... 342/357.02 |
| 6,020,845 | A | * | 2/2000 | Weinberg et al. ........ 342/354 |
| 6,654,357 | B1 | * | 11/2003 | Wiedeman ............... 370/315 |
| 6,741,841 | B1 | * | 5/2004 | Mitchell ................. 455/188.1 |
| 2002/0027524 | A1 | * | 3/2002 | Pippin ................... 342/357.08 |
| 2002/0149514 | A1 | * | 10/2002 | Fichter et al. .......... 342/357.01 |
| 2006/0189309 | A1 | * | 8/2006 | Good et al. ............. 455/427 |

FOREIGN PATENT DOCUMENTS

| KR | 1020000019477 | 4/2000 |
| KR | 1020030042543 | 6/2003 |
| KR | 1020030067865 | 8/2003 |
| KR | 1020030068637 | 8/2003 |
| KR | 1020060059662 | 6/2006 |

OTHER PUBLICATIONS

KIPO Patent Grant dated May 4, 2007 for the corresponding application KR 10-2005-0109658.

* cited by examiner

*Primary Examiner*—Thomas H. Tarcza
*Assistant Examiner*—Harry Liu
(74) *Attorney, Agent, or Firm*—Ladas & Parry LLP

(57) ABSTRACT

Provided is a Global Positioning System (GPS) signal repeater and a GPS receiver of a stationary orbit satellite, and a method for positioning a stationary orbit satellite using the same. The GPS signal repeater includes: a GPS receiver for receiving an L-band GPS signal transmitted from a GPS satellite; a low-noise amplifier for removing noise of the received L-band GPS signal and maximally amplifying a desired signal; a frequency transformer for transforming the amplified L-band GPS signal into an up-link frequency band; a high power amplifier for amplifying the transformed up-link frequency band GPS signal; and a transmitter for transmitting the amplified signal to a stationary orbit satellite.

5 Claims, 3 Drawing Sheets

GPS SIGNAL REPEATER AND GPS RECEIVER OF STATIONARY ORBIT SATELLITE, AND METHOD FOR POSITIONING STATIONARY ORBIT SATELLITE USING THE SAME

FIELD OF THE INVENTION

The present invention relates to a Global Positioning System (GPS) signal repeater and a GPS receiver of a stationary orbit satellite, and a method for positioning a stationary orbit satellite using the same; and, more particularly, to a GPS signal repeater and a GPS receiver of a stationary orbit satellite, and a method for positioning a stationary orbit satellite using the same by setting up at least 4 simple GPS signal repeaters capable of transmitting a GPS signal to the stationary orbit satellite, and receiving the GPS signal in the stationary orbit satellite.

DESCRIPTION OF RELATED ART

Since a stationary orbit satellite moves around the earth once a day, just as the earth rotates on its own axis, the stationary orbit satellite seems to be positioned in a fixed place. However, precisely, the orbit position of the stationary orbit satellite is changed little by little due to random city of gravitational field of the earth, gravity of the sun and the moon, and perturbation. Therefore, it is required to control the satellite to maintain the orbit within a predetermined range. A ground satellite control center determines a position of the satellite, and monitors and controls the satellite.

Meanwhile, the GPS includes 24 satellites on 6 orbits, has an altitude of 20,200 Km, an angle of inclination of 55°, a cycle of 12 hours. Each satellite uses two L-band frequencies, L1 of 1,575.42 MHz and L2 of 1,227.6 MHz. The GPSs are distributed such that a ground user can receive signals from at least 5 satellites. The GPS is developed for military purposes, but currently applied to aircraft control, earthquake monitoring, and rescue as the most general navigation system. The general public also uses the GPS. In particular, the GPS is used to determine the satellite position in a low earth orbit-satellite (LEO-satellite) which can receive a GPS signal by being positioned under the GPS satellite orbit.

Since the stationary orbit satellite is positioned in the upper air of about 35,786 Km from the equator, the stationary orbit satellite cannot receive a GPS signal. A system for measuring a distance from the ground satellite control center to an individual satellite is used to determine a position of the stationary orbit satellite.

When an antenna of the control center transmits a distance measuring signal tone, the distance measuring system is operated based on a method that the satellite receives and reflects the distance measuring signal tone, and the antenna of the control center receives the reflected distance measuring signal tone again and measures a phase difference of the signal. The distance of the stationary orbit satellite can be measured by using a control center antenna or at least two antennas, which are off from each other. A method for improving precision of satellite position determination is to measure a distance based on the different ground antennas and uses the acquired distance measuring data.

In the conventional technology described above, there is a limit that the GPS, which is the most general navigation system, is not used to determine the position of the stationary orbit satellite since the stationary orbit satellite is characteristically positioned on the satellite orbit where the GPS signal is not received. Therefore, the ground satellite control center measures a distance of the satellite based on an individual distance measuring system and determines the position of the stationary orbit satellite. Since the technology requires that an operator should command a distance measuring device, collects and processes distance measuring data in the ground control center, there is a disadvantage that work and effort of the operator are necessary.

SUMMARY OF THE INVENTION

It is, therefore, an object of the present invention to provide a Global Positioning System (GPS) signal repeater and a GPS receiver of a stationary orbit satellite, and a method for positioning a stationary orbit satellite using the same by setting up at least 4 simple GPS signal repeater capable of transmitting a GPS signal to the stationary orbit satellite, and receiving the GPS signal in the stationary orbit satellite receive the GPS signal.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a GPS signal repeater, including: a GPS receiver for receiving an L-band GPS signal transmitted from a GPS satellite; a low-noise amplifier for removing noise of the received L-band GPS signal and maximally amplifying a desired signal; a frequency transformer for transforming the amplified L-band GPS signal into an up-link frequency band; a high power amplifier for amplifying the transformed up-link frequency band GPS signal; and a transmitter for transmitting the amplified signal to a stationary orbit satellite.

In accordance with another aspect of the present invention, there is provided a GPS receiver of the stationary orbit satellite, including: a low-noise amplifier for removing noise of the up-link frequency band GPS signal transmitted from the stationary orbit satellite and maximally amplifying a desired signal; a frequency band divider for dividing the amplified signal into a plurality of unique frequency bands; a GPS signal creator for creating a plurality of divided signals as a L-band GPS signal; and a position calculator for selecting a GPS satellite among a plurality of L-band GPS signals and calculating a position of a stationary orbit satellite based on information on a plurality of GPS satellites and a radio wave time of flight of the GPS satellites.

In accordance with another aspect of the present invention, there is provided a method for determining a position of a stationary orbit satellite by receiving a GPS signal from a GPS signal repeater of the claims 1 and 2 in a GPS receiver of the stationary orbit satellite of the claims 3 and 4, including: a) transforming an L-band GPS signal transmitted from a GPS satellite into an up-link frequency band, respectively, and transmitting the L-band GPS signal to the stationary orbit satellite based on each of the allocated frequency bands; and b) creating the received up-link frequency band GPS signal as the L-band GPS signal, selecting a GPS satellite in the created L-band GPS signal and calculating a position of the stationary orbit satellite based on information on a plurality of GPS satellites and a radio wave time of flight of the GPS satellites.

As described above, at least 4 GPS repeaters, which are installed in a well-known position, receive the GPS signal, transform the GPS signal into the allocated frequency and transmit the GPS signal to the stationary orbit satellite. The stationary orbit satellite receives the up-link frequency band GPS signal from at least 4 GPS repeaters. Since each GPS repeater transmits the GPS signal based on each of the allocated frequency band, the stationary orbit satellite can acquire which GPS repeater the up-link frequency band GPS signal is transmitted through. That is, since the stationary orbit satellite receives the received up-link frequency band GPS signal from the GPS satellite through the ground GPS repeaters, the route of the GPS signal is very clear and at least 4 routes are learned. When the position determining system of the satellite of the present invention calculates 3 open ones of three-dimensional (3D) space and an open one by a time error through an equation for calculating a position, the stationary orbit satellite can calculate the position of the stationary orbit satellite.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
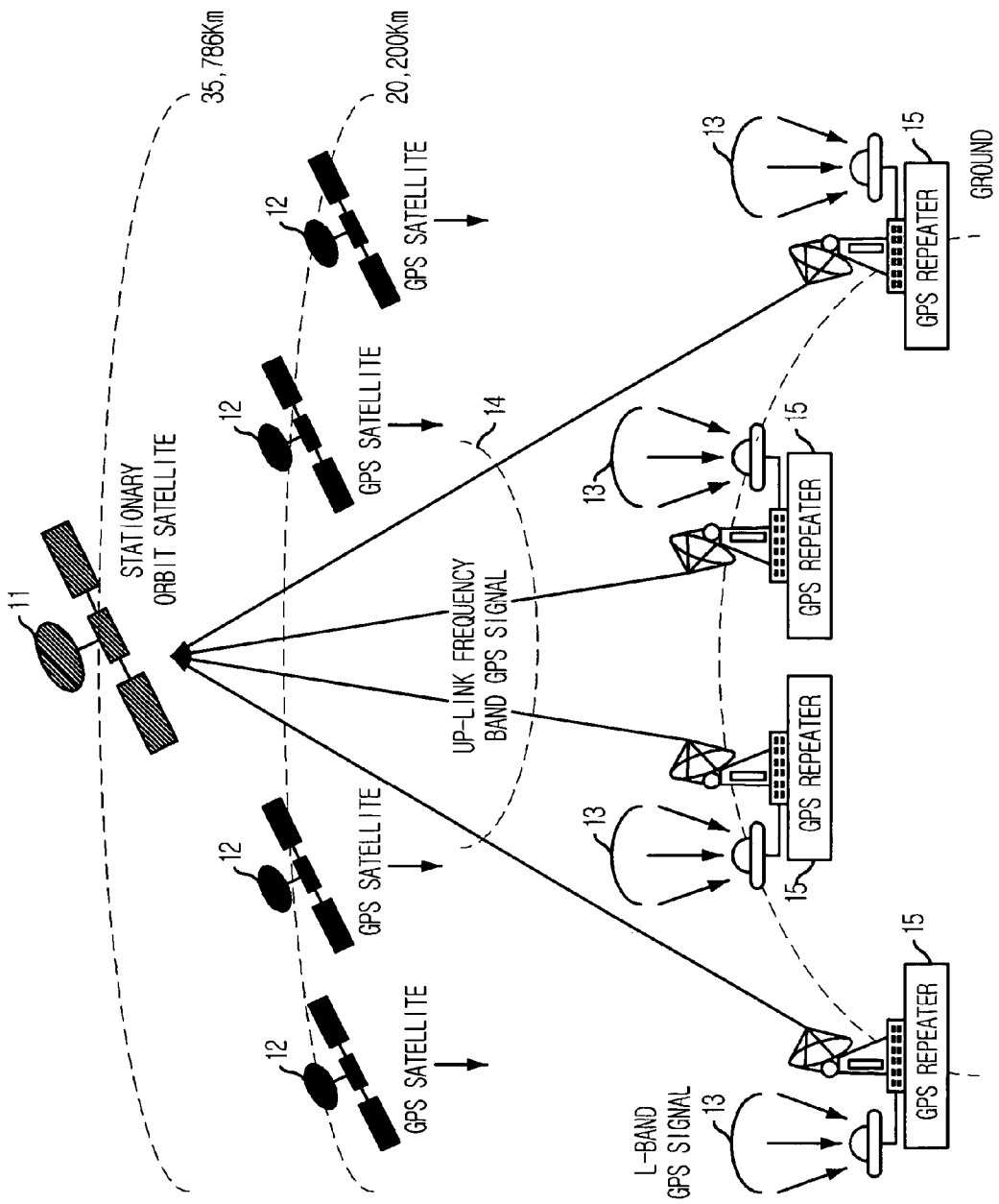
FIG. 1 is a view showing a position determining system of a stationary orbit satellite in accordance with an embodiment of the present invention.

FIG. 1 shows a position determining system of a stationary orbit satellite in accordance with an embodiment of the present invention.

FIG. 1 shows a stationary orbit satellite 11, Global Positioning System (GPS) satellites 12, L-band GPS signals 13 transmitted from the GPS satellites 12, at least 4 GPS repeaters 15 and a up-link frequency band GPS signal 14 transmitted from the GPS repeaters 15. The GPS repeaters 15 receive a GPS signal and transform the GPS signal into the up-link frequency band.

Signal interference should not be generated between the up-link frequency band GPS signal 14, which is transmitted from the ground GPS repeaters 15, and the L-band GPS signal 13, which is transmitted from the GPS satellite 12.

In the position determining system of the satellite of the present invention, a distance measuring method is that the L-band GPS signal 13 transmitted from the GPS satellite 12 uses an electric wave delay time arriving at a GPS receiver (not shown). Accordingly, when the ground GPS repeaters 15 transmits the same L-band GPS signal 13, interference may be generated in reception of the L-band GPS signal 13 to be transmitted from the GPS satellite 12.

Therefore, the up-link frequency band GPS signal 14 transmitted from the GPS repeaters 15 uses a frequency band allocated for communication with the satellite excluding a frequency band of the L-band GPS signal 13.

Meanwhile, at least 4 GPS repeaters 15 are installed and fixed on the ground. A position of each GPS repeaters 15 is calculated during installation since the GPS repeaters 15 receive the GPS signal. The up-link frequency band GPS signal 14 transmitted from the 4 GPS repeaters 15 should be respectively allocated. This is because the stationary orbit satellite 11 should figure out which one of the GPS repeaters 15 the received up-link frequency band GPS signal 14 is transmitted through. That is, it is to clarify a route of the GPS signal transmitted from the GPS satellite 12 to the stationary orbit satellite 11 through the well-known ground GPS repeaters 15. That is, since the stationary orbit satellite 11 receives the received up-link frequency band GPS signal 14 from the GPS satellite 12 through the ground GPS repeaters 15, the route of the GPS signal is very clear and at least 4 routes are learned. When the position determining system of the satellite of the present invention calculates 3 open ones of three-dimensional (3D) space and an open one by a time error through an equation for calculating a position, the stationary orbit satellite 11 can calculate the position of the stationary orbit satellite 11.

Figure 2:
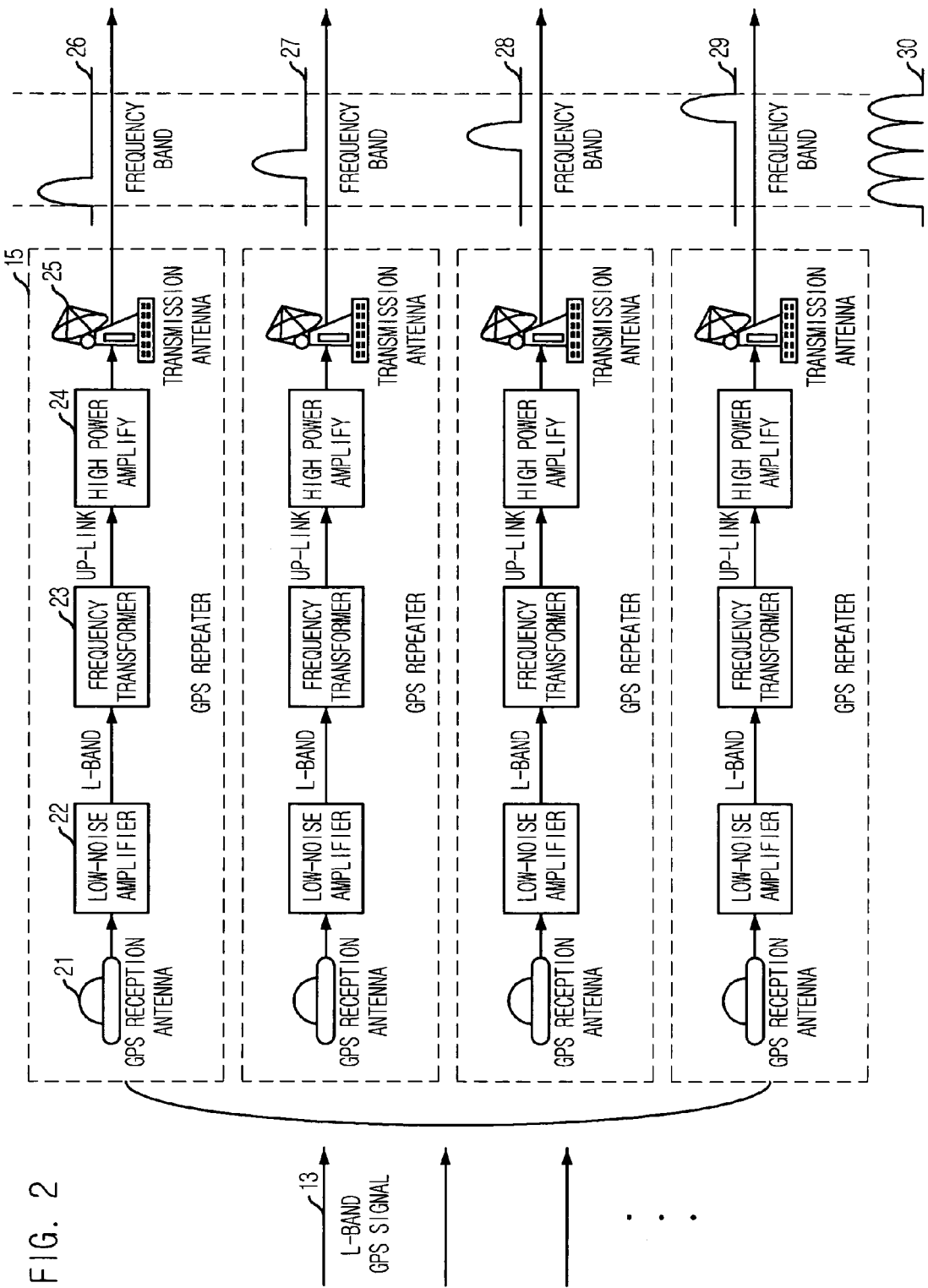
FIG. 2 is a block diagram describing a GPS signal repeater in accordance with the embodiment of the present invention.

FIG. 2 shows a GPS signal repeater in accordance with the embodiment of the present invention.

In case of the GPS repeaters 15 of the present invention, at least 4 GPS repeaters of the same structure are, respectively, installed and fixed on the ground. The GPS repeater 15 includes a GPS reception antenna 21, a low-noise amplifier 22, a frequency transformer 23, a high power amplifier 24, and a transmission antenna 25. The GPS reception antenna 21 receives an L-band GPS signal transmitted from the GPS satellite 12. The low-noise amplifier 22 removes noise of the L-band GPS signal received through the GPS reception antenna 21 and maximally amplifies a desired signal. The frequency transformer 23 transforms the L-band GPS signal amplified through the low-noise amplifier 22 into the up-link frequency band. The high power amplifier 24 amplifies the up-link frequency band GPS signal transformed through the frequency transformer 23. The transmission antenna 25 transmits the signal amplified through the high power amplifier 24 to the stationary orbit satellite 11.

An operation of the GPS signal repeater of the present invention having the structure described above will be described in detail.

Since a unique position of the GPS repeaters 15 can be recognized through the up-link frequency band GPS signal uniquely allocated by the GPS repeaters, the GPS signal should be transmitted to the up-link frequency band uniquely allocated by each of the GPS repeaters 15. Therefore, the frequency transformer 23 of each GPS repeater 15 is set up and used to be transformed into the allocated up-link frequency band. The up-link frequency band GPS signals created in each GPS repeater 15 are displayed as frequency bands 26 to 29. When the signals are synthesized, the signals are as shown in a spectrum 30.

Figure 3:
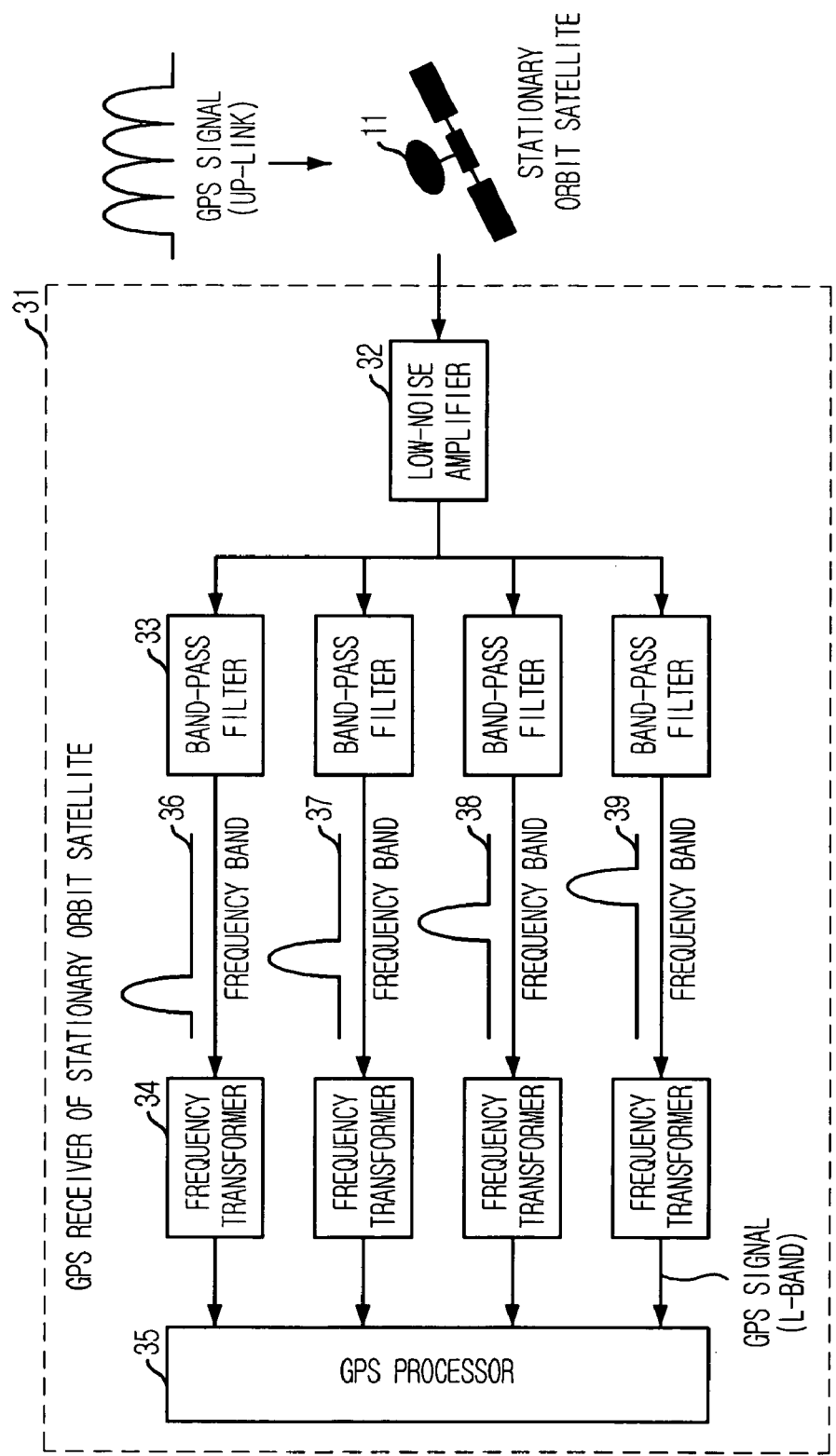
FIG. 3 is a block diagram illustrating a GPS receiver of the stationary orbit satellite in accordance with the embodiment of the present invention.

FIG. 3 shows a GPS receiver of the stationary orbit satellite in accordance with the embodiment of the present invention.

The GPS receiver of the stationary orbit satellite has a reverse structure of the ground GPS repeaters 15 and includes a low-noise amplifier 32, a band-pass filter 33, a frequency transformer 34, and a GPS processor 35. The low-noise amplifier 32 removes noise from the up-link frequency band GPS signal transmitted from the reception antenna of the stationary orbit satellite 11 and maximally amplifies a desired signal. The band-pass filter 33 divides the signal amplified through the low-noise amplifier 32 into 4 unique frequency bands. The frequency transformer 34 creates 4 signals divided by the band-pass filter 33 as the L-band GPS signal. The GPS processor 35 selects one GPS satellite among the L-band GPS signals transmitted through the frequency transformer 34 and calculates a position of the stationary orbit satellite 11 based on information on the entire 4 GPS satellites and radio wave time of flight of the GPS satellite.

An operation of the GPS receiver 31 of the stationary orbit satellite having the structure described above will be described in detail in accordance with the embodiment of the present invention. The up-link frequency band GPS signal transmitted from the reception antenna of the stationary orbit satellite 11 passes the band-pass filter 33 through the low-noise amplifier 32 and is divided into unique frequency bands 36 to 39. Each signal is created as the L-band GPS signal by the frequency transformer 34 and calculates a position of the stationary orbit satellite 11 in the GPS processor 35.

That is, the GPS processor 35 receives 4 identical GPS signals, but selects only one GPS satellite among the GPS signals and calculates a position of the stationary orbit satellite based on the GPS satellite information and a radio wave time of flight of the GPS satellite. The GPS processor 35 acquires and calculates a value of 3 3D open ones and an open one by a time error, just as the method for calculating a position of an object in the general GPS receiver.

Also, the GPS processor 35 receives the GPS signal in the stationary orbit satellite 11 the GPS satellite 12 from through the well-known ground GPS repeaters 15. Since the GPS processor 35 already figures out the position of the 4 GPS repeaters 15 fixed on the ground, the GPS processor 35 removes information on the distance from the GPS satellite 12 to the GPS repeaters 15 and calculates the distance from the GPS repeaters 15 to the stationary orbit satellite 11.

As described above, the present invention can apply the GPS, which is the most general and comfortable navigation system, to the position determination of the stationary orbit satellite by installing at least 4 simple GPS signal repeaters on the ground, which can transmit the GPS signal to the stationary orbit satellite, and by making the stationary orbit satellite receive the GPS signal.

Since the stationary orbit satellite independently determines the position based on the GPS, the present invention does not require an additional distance measuring system in the ground control center. Also, the present invention can reduce work and effort of the operator for measuring the distance on the ground.

As described above, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0109658, filed with the Korean Intellectual Property Office on Nov. 16, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A Global Positioning System (GPS) receiver of a stationary orbit satellite, comprising:
    a low-noise amplifying means for removing noise from an up-link frequency band GPS signal transmitted to the stationary orbit satellite and maximally amplifying a desired signal;
    a frequency band dividing means for dividing the amplified signal into a plurality of signals each having a unique frequency bands;
    a GPS signal creating means for creating the divided signals as L-band GPS signals; and
    a position calculating means for selecting a GPS satellite among the L-band GPS signals and calculating a position of a stationary orbit satellite based on information on the GPS satellites and radio wave time of flight of the GPS satellites,
    wherein the up-link frequency band GPS signal excludes a frequency band of the L-band GPS signal to avoid interference of the L-band GPS signal.

2. The GPS receiver as recited in claim 1, wherein when the up-link frequency band GPS signal from the GPS satellite through, the GPS repeater is received, the position calculating means removes information on a distance from the GPS satellite to the GPS repeater and calculates only a distance from the GPS repeater to the stationary orbit satellite.

3. A method for positioning a stationary orbit satellite by receiving a Global Positioning System (GPS) signal from a GPS signal repeater in a GPS receiver of the stationary orbit satellite, comprising:
    a) transforming an L-band GPS signal transmitted from-a GPS satellite into an up-link frequency band signal, and transmitting the L-band GPS signal to the stationary orbit satellite based on allocated frequency band; and
    b) creating the received up-link frequency band GPS signal as the L-band GPS signal, selecting only one GPS satellite based on the created L-band GPS signal, and calculating a position of the stationary orbit satellite based on information on a plurality of GPS satellites and a radio wave time of flight of the GPS satellites,
    wherein a GPS signal repeater, comprises: a GPS receiver for receiving an L-band GPS signal transmitted from a GPS satellite; a low-noise amplifier for removing noise of the received L-band GPS signal and maximally amplifying a desired signal; a frequency transformer for transforming the amplified L-band GPS signal into an up-link frequency band; a high power amplifier for amplifying the transformed up-link frequency band GPS signal; and a transmitter for transmitting the amplified signal to a stationary orbit satellite , and a GPS receiver of a stationary orbit satellite, comprises: a low-noise amplifier for removing noise of the up-link frequency band GPS signal transmitted from the stationary orbit satellite and maximally amplifying a desired signal; a frequency band divider for dividing the amplified signal into a plurality of unique frequency bands; a GPS signal creator for creating a plurality of divided signals as a L-band GPS signal; and a position calculator for selecting a GPS satellite among a plurality of L-band GPS signals and calculating a position of a stationary orbit satellite based on information on a plurality of GPS satellites and a radio wave time of flight of the GPS satellites, wherein the up-link frequency band GPS signal excludes a frequency band of the L-band GPS signal to avoid interference of the L-band GPS signal.

4. The method as recited in claim 3, wherein at least 4 GPS signal repeaters are installed on the ground in an identical structure to easily figure out a route of an electric wave and a GPS signal repeater through which the up-link frequency band GPS signal is transmitted.

5. The method as recited in claim 4, wherein since the positions of at least 4 GPS signal repeaters installed on the ground are acquired, the GPS receiver of the stationary orbit satellite calculates a position of the GPS receiver by removing information on a distance from the GPS satellite to the GPS signal repeater, and calculating only a distance from the GPS signal repeater to the stationary orbit satellite.

* * * * *